UNITED STATES PATENT OFFICE.

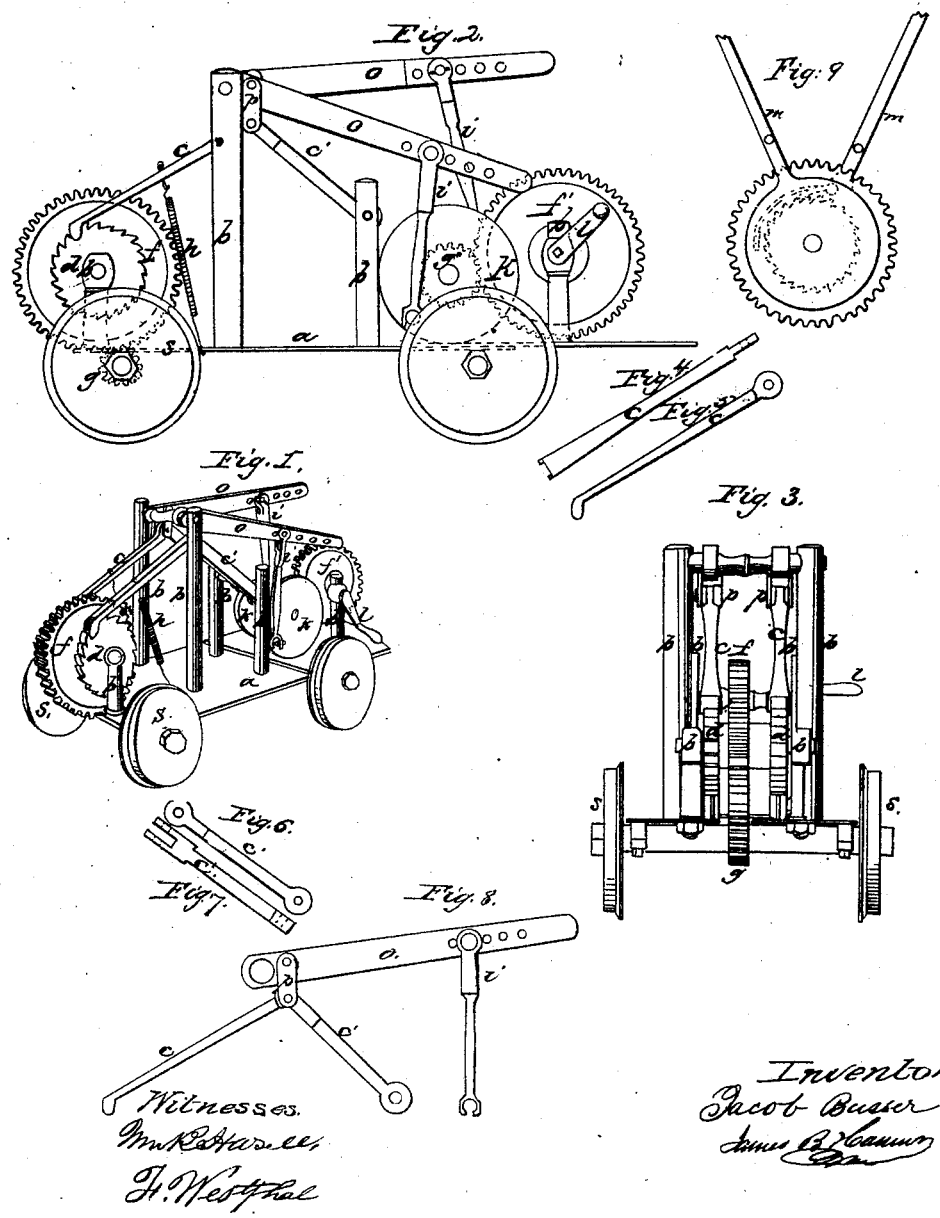

JACOB BUSSER AND JAMES B. HARMER, OF PHILADELPHIA, PENNSYLVANIA.

MACHINERY FOR PROPELLING RAILROAD-CARS, &c.

Specification of Letters Patent No. 28,153, dated May 8, 1860.

*To all whom it may concern:*

Be it known that we, JACOB BUSSER and JAMES B. HARMER, of Philadelphia, in the county of Philadelphia, in the State of Pennsylvania, have invented a new and useful Machine for Propelling Railroad-Cars and other Like Purposes, and which we call the "Automatic Car," said machine consisting of wheels, levers, and other mechanical devices so arranged and combined as to be easily put and kept in motion by manpower, thereby dispensing with horses or steam on city passenger-railways, reducing the expense and danger of running the same; and we do hereby declare that the following is a full, clear, and exact description of the same, reference being had to the accompanying drawings, making a part of this specification, in which—

Figure 1 is a perspective view; Fig. 2, a longitudinal elevation; Fig. 3 an end elevation; Figs. 4, 5, 6, 7, separate and detached views of the levers; Fig. 8, a longitudinal elevation of the levers connected, but apart from the machine; Fig. 9, a view of a lever arrangement for working the machine, in the place of the crank.

Like letters refer to like parts; letter $a$ the platform or floor; $b$ $b$ $b$ $b$ uprights for supporting the working parts of the machine, $c$, $c$, $c'$, $c'$, $o$, $o$, levers; $d$ $d$ ratchet wheels $f$, $f'$ spur wheels, $g$, $g'$ pinions; the pinion $g$ being on the axle of the driving wheels; $h$, $h$, helical springs, for the purpose of keeping the ends of the levers $c$, $c$, in place; $i$, $i$ connecting rods, connecting the ends of the levers $o$, $o$, with the crank wheels $k$, $k$, $l$, crank: $p$, $p$ links connecting the ends of the levers $o$, $o$, with the levers $c$, $c$ $c'$, $c'$, at their fulcrums; $s$, $s$, driving wheels.

It is intended that the machine shall be separate from the passenger car, the same being inclosed, and covered by a car body, the interior to be fitted up with seats, and to be used as a smoking car, and the conveyance of large packages.

The operation of the invention is as follows, the wheel $f'$, being set in motion by the turning of the crank $l$, or the forward and backward motion of the levers $m$, $m$, as shown in Fig. 9, and which motion is similar to that of a boy in his velocipede, imparts motion to the crank wheels $k$, $k$, by means of the pinion $g'$, thus raising or depressing the levers $o$, $o$, which in their turn act upon the levers $c$, $c$, $c'$, $c'$ by means of the links $p$, $p$, alternately drawing back and thrusting forward the levers $c$, $c$, the ends of which acting upon the ratchet wheels $d$, $d$, cause them to revolve, thus imparting motion to the cog-wheel $f$, which works in the pinion $g$ on the axle of the driving wheels $s$, $s$, causes them to turn.

The arrangement shown in Fig. 9 is similar to the dog and ratchet as used in the winding parts of clocks.

We do not confine ourselves to any particular number of wheels or levers, as the same may be increased to any desirable extent, as we may wish to increase our power.

We do not claim to be the inventors of any of the parts taken separately, as they are all well known mechanical devices. But What we do claim as our invention and desire to secure by Letters Patent is—

The levers $o$, $o$, $c$, $c$, $c'$, $c'$ in connection with the crank wheels $k$, $k$, the spur wheels $f$, $f'$, and pinions $g$, $g'$ or their equivalents, the whole combined substantially in the manner set forth, and for purposes herein specified.

JACOB BUSSER. [L. S.]
JAMES B. HARMER. [L. S.]

Witnesses:
WILLIAM SHANE,
REUBEN ZETNER.